No. 786,036. PATENTED MAR. 28, 1905.
H. N. KING.
TROLLEY WHEEL AND HOLDER.
APPLICATION FILED JUNE 20, 1904.
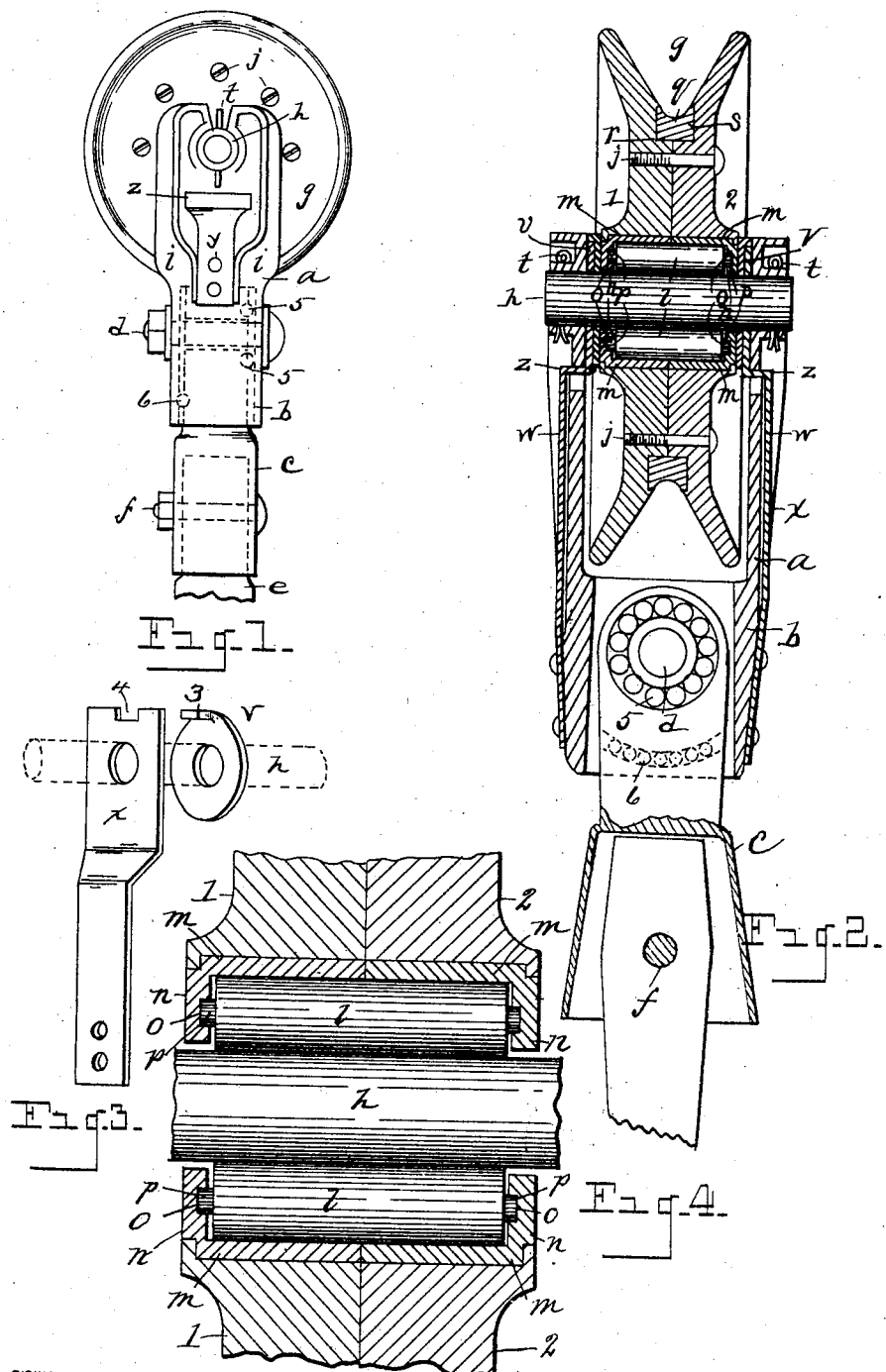

No. 786,036.

Patented March 28, 1905.

UNITED STATES PATENT OFFICE.

HENRY N. KING, OF ADRIAN, MICHIGAN.

TROLLEY-WHEEL AND HOLDER.

SPECIFICATION forming part of Letters Patent No. 786,036, dated March 28, 1905.

Application filed June 20, 1904. Serial No. 213,423.

*To all whom it may concern:*

Be it known that I, HENRY N. KING, a citizen of the United States, residing at Adrian, county of Lenawee, State of Michigan, have invented a certain new and useful Improvement in Trolley-Wheels and Holders, of which the following is a specification, reference being had to the accompanying drawings, which form a part of this specification.

My invention has for its object certain new and useful improvements in a trolley-wheel and holder; and it consists in the construction, combination, and arrangement of devices and appliances hereinafter described and claimed, and illustrated in the accompanying drawings, in which—

Figure 1 is a view in side elevation. Fig. 2 is an enlarged view, in vertical section, through the harp at right angles to the view shown in Fig. 1 and through a portion of the pole-socket. Fig. 3 is a detail view showing the spring and washer in position to be assembled. Fig. 4 is an enlarged detail view through portions of the trolley-wheel.

My invention is designed to provide a trolley-wheel and holder in which friction shall be taken away and by which the liability of the trolley-wire cutting into the trolley-wheel shall be reduced to a minimum, my object being to provide a trolley-wheel and holder which will be of superior efficiency, durability, and utility.

I carry out my invention as follows:

In the drawings, $a$ represents a harp or fork constructed, as shown, with a hollow shank $b$ at the lower end to receive a trolley-pole socket $c$, said socket being secured in said shank by a pivot or bolt $d$, passed through said fork. The lower end of said socket is chambered to receive the upper end of the trolley-pole $e$, the pole being secured in said socket by a pivot or bolt $f$. A trolley-wheel $g$ is journaled in said fork, the journal being shown at $h$. The fork is constructed, preferably, with ribs $i$ toward the upper end on the exterior thereof, said ribs extending, preferably, about the extremities of the journal $h$, as shown.

The trolley-wheel I prefer to make in two parts, (indicated by the numerals 1 and 2,) bolted together, as indicated, by bolts $j$. The hub of the trolley-wheel is chambered, as shown, to receive a series of roller-bearings $l$, said bearings being inclosed within wearing-rings $m$ $m$, provided at their outer ends with thrust-collars, (indicated at $n$.) Each wearing-ring and its thrust-collar is preferably made of one integral piece of metal, there being a wearing-ring and thrust-collar or bearing for each half of the trolley-wheel, each ring and its thrust-bearing being driven into place in each half of the trolley-wheel. Each ring and its thrust-bearing is extended to the outside of the hub of the wheel, as shown, the thrust-bearings at the ends of the rings being recessed, as indicated at $o$, to provide for journaling the rollers $l$ therein. These rings and their thrust-bearings are made to withstand the roller-friction of the rolls $l$. It will be understood that the rings and their thrust-bearings are made of suitable hardened metal. The journals of the roller-bearings are indicated at $p$, whereby the roller-bearings are confined in place. The journal $h$ of the trolley-wheel is thus efficiently provided with roller-bearings to prevent friction in the rotation of the wheel. On the periphery thereof the two parts of the trolley-wheel are recessed, as indicated at $q$, to engage the trolley-wire, and they are also recessed, as indicated at $r$, to receive a hardened metal ring $s$. The hardened ring $s$ is designed to take the wear in the contact of the wheel to prevent the wire from cutting through the wheel. The journal $h$ is preferably constructed to receive split cotters $t$ at each end thereof to keep the journal in place. Contact-washers $v$ are located at the extremities of the hub of the trolley-wheel, and $w$ and $x$ indicate springs secured at their lower extremities to the exterior surfaces of the fork, as indicated at $y$. The upper extremities of said springs are passed through slots $z$ in the sides of the fork and press against said contact-washers to hold the contact-washers in firm electrical contact with the trolley-wheel, so that the current from the wire will be efficiently carried to the trolley-wheel holder. To prevent the contact-washers from rotating, I prefer to construct each of said washers with a shoulder 3, projecting into the recess 4 of the corresponding spring, by which means said washers are held in place. I prefer to provide the upper end of the pole-socket $c$ with antifriction-bearings also, (indicated at 5,) constructed and arranged in any suitable manner and located about the journal $d$ between the pole-socket and the harp, to prevent friction. I also prefer to provide ball-bearings, as indicated at 6, on the opposite side of the pole-socket between the pole-socket and the harp. It will thus be seen that the socket $c$ swivels on the pivot $d$, the antifriction-bearings 5 and 6 relieving any friction that might otherwise arise in the movement of the fork and pole-socket, the one in relation to the other. The pole swivels on the pivot $f$. The chamber of the shank $b$ is preferably made a little larger than the adjacent extremity of the socket $c$, so as to afford a little play or movement of said socket in order the better to enable the trolley-wheel to travel about a curve, and thereby avoid the chafing of the wire upon the sides of the wheel in going about curves.

I have found that in use there is a heavy end thrust on the roller-bearings liable to wear away the hub of the trolley-wheel unless provision is made to guard thereagainst; but by use of the hardened wearing-rings $m$ and their thrust-bearings $n$ this liability is quite effectually overcome. By extending the wearing-rings and their thrust-bearings to the exterior of the hub the washers $u$ $v$ are prevented from cutting away the ends of the hub. By this construction the wear comes on the washers, which are preferably made of copper or other suitable metal and which can be replaced, when required, with a slight expense.

The operation of the device will now be readily understood.

It is evident that the metal ring $s$ is in the nature of a tire, serving also as a binding or locking ring for the purpose of holding the two halves of the wheel in place even before they are bolted together, thereby preventing the chambers which hold the bearing-rings $m$ and the roller-bearings from becoming displaced or slipping by one another.

About the journal $d$ of the pole-socket, on one side thereof, the socket is channeled, as shown, to receive the ball-bearings.

What I claim as my invention is—

1. In combination a fork, a trolley-wheel journaled in the fork, said trolley-wheel comprising two parts, each formed with a web and with a central chambered hub, the webs of the wheel bolted together, and a hardened peripheral ring engaged between said parts, and serving as a tire to hold the chambers of the hubs in proper position.

2. In combination a fork, a trolley-wheel journaled in the fork, said wheel comprising two parts, each formed with a web, and with a central chambered hub, the webs of the wheel bolted together, said parts formed with adjacent recesses on their periphery, and a hardened peripheral metal ring located in the said recesses between said parts.

3. In combination a fork, a trolley-wheel journaled in the fork, said trolley-wheel comprising two parts, each formed with a web and with a chambered central hub, the webs of the wheel bolted together, a hardened peripheral ring engaged between said parts, and roller-bearings journaled at their extremities within the hubs of the wheel.

4. The combination of a fork, a trolley-wheel journaled in the fork, roller-bearings for the journal of the wheel, a pole-socket journaled in the fork, and ball-bearings between the pole-socket and the fork, said fork chambered at its lower end to receive the pole-socket, the chamber of the fork being of greater diameter than the diameter of the pole-socket to allow a vibratory movement of the fork, for the purpose described.

5. The combination of a fork, a trolley-wheel journaled in the fork, antifriction-bearings for the journal of the wheel, a pole-socket journaled in the fork, antifriction-bearings for the journal of the pole-socket, and antifriction-bearings between the pole-socket and the fork, the antifriction-bearings for the said journal, and the antifriction-bearings between the pole-socket and the fork being on opposite sides of the pole-socket.

6. The combination of a fork, a trolley-wheel journaled in the fork, roller-bearings for the journal of the wheel, a pole-socket journaled in the fork, antifriction-bearings for the journal of the pole-socket and ball-bearings between the pole-socket and the fork, said antifriction-bearings and said ball-bearings being on opposite sides of the pole-socket, the antifriction-bearings on one side of the pole-socket being located about one end of the pole-socket journal, and the ball-bearings on the other side of the pole-socket being located toward the lower end of the pole-socket.

7. In combination a fork, a trolley-wheel journaled in the fork, said wheel comprising two parts, each formed with a hub bolted to the adjacent web, and with a central hub chambered lengthwise of the journal of the wheel, wearing-rings located in the chambered hubs, respectively, end to end, and provided with thrust-collars at their outer extremities, and roller-bearings about the journal of the wheel, said bearings journaled at their extremities in said thrust-collars, a pole-socket journaled on the fork, antifriction-bearings between the pole-socket and the fork on opposite sides thereof.

8. In combination a fork, a trolley-wheel journaled in the fork comprising two parts, each formed with a web bolted to the adjacent web, and with a central hub chambered lengthwise of the journal of the wheel, wearing-rings located in the chambers of the hubs respectively, end to end, provided with thrust-collars at their outer extremities, a washer encircling the journal of the wheel to contact with the adjacent thrust-collar, and an electrical contact-spring provided to hold the washer in electrical contact with the thrust-collar, said washer formed with a shoulder engaged by said spring to hold the washer from turning.

In testimony whereof I have signed this specification in the presence of two subscribing witnesses.

HENRY N. KING.

Witnesses:
   JNO. A. RILEY,
   FRED A. ACKER.